United States Patent
Tanner

(10) Patent No.: US 11,964,543 B2
(45) Date of Patent: Apr. 23, 2024

(54) VEHICLE DEODORIZER ASSEMBLY

(71) Applicant: Deric Tanner, Forney, TX (US)

(72) Inventor: Deric Tanner, Forney, TX (US)

( * ) Notice: Subject to any disclaimer, the term of this patent is extended or adjusted under 35 U.S.C. 154(b) by 392 days.

(21) Appl. No.: 17/512,213

(22) Filed: Oct. 27, 2021

(65) Prior Publication Data

US 2023/0126336 A1 Apr. 27, 2023

(51) Int. Cl.
B60H 3/00 (2006.01)

(52) U.S. Cl.
CPC ... B60H 3/0035 (2013.01); *B60H 2003/0042* (2013.01)

(58) Field of Classification Search
CPC .......... B60H 2003/0042; B60H 3/0035; B60H 3/0021
USPC ........................................................ 454/157
See application file for complete search history.

(56) References Cited

U.S. PATENT DOCUMENTS

| | | | | |
|---|---|---|---|---|
| 4,805,520 A | * | 2/1989 | Freedman | B60H 3/0007 454/157 |
| 5,171,485 A | * | 12/1992 | Ryan | A61L 9/03 261/DIG. 65 |
| 5,833,929 A | * | 11/1998 | Watson | B60H 3/0007 422/123 |
| 5,882,256 A | * | 3/1999 | Shropshire | B60H 3/0035 454/157 |
| D602,374 S | | 10/2009 | Gilliard, II | |
| 9,827,831 B1 | | 11/2017 | Zaldumbide | |
| 10,245,923 B1 | | 4/2019 | Lau | |
| 2002/0137455 A1 | * | 9/2002 | Ivanov | B60S 1/482 454/157 |
| 2009/0242656 A1 | | 10/2009 | Peard | |
| 2013/0262345 A1 | | 10/2013 | Ciavarella | |
| 2016/0213802 A1 | | 7/2016 | Scheer | |
| 2022/0274465 A1 | * | 9/2022 | Konya | B60H 3/0007 |

* cited by examiner

*Primary Examiner* — Allen R. B. Schult

(57) ABSTRACT

A vehicle deodorizer assembly includes a reservoir which contains a chemical fragrance and the reservoir is integrated into a vehicle. A pump is integrated into the vehicle and the pump is in fluid communication with the reservoir thereby facilitating the pump to urge the chemical fragrance outward from the reservoir. A pair of nozzles is each integrated into the cabin of the vehicle to release the chemical fragrance into the cabin wherein the nozzles are configured to enhance the odor of the cabin. An actuate button is disposed in the cabin of the vehicle and the actuate button is in communication with the pump. Furthermore, the actuate button turns on the pump when the actuate button is depressed.

6 Claims, 4 Drawing Sheets

VEHICLE DEODORIZER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to deodorizer device and more particularly pertains to a new deodorizer device for enhancing the odor of a cabin of a vehicle. The device includes a reservoir containing a chemical fragrance and pump that is fluidly coupled to the reservoir. The device includes a pair of nozzles that are each integrated into a dashboard of the vehicle and an actuate button that is integrated into the dashboard. The nozzles are in fluid communication with the pump to release the chemical fragrance into the cabin each time the actuate button is depressed.

(2) Description of Related Art Including Information Disclosed Under 37 CFR 1.97 and 1.98

The prior art relates to deodorizer devices including a variety of vehicle air freshener devices that each at least includes a fragrance reservoir and a pump. The deodorizer devices each dispensing outlets that are integrated into a variety of locations, including existing air vents in the vehicle, beneath seats in the vehicle, and an HVAC system of the vehicle. In no instance does the prior art disclose a vehicle air freshener that includes nozzles which are integrated into a dashboard of the vehicle.

BRIEF SUMMARY OF THE INVENTION

An embodiment of the disclosure meets the needs presented above by generally comprising a reservoir which contains a chemical fragrance and the reservoir is integrated into a vehicle. A pump is integrated into the vehicle and the pump is in fluid communication with the reservoir thereby facilitating the pump to urge the chemical fragrance outward from the reservoir. A pair of nozzles is each integrated into the cabin of the vehicle to release the chemical fragrance into the cabin wherein the nozzles are configured to enhance the odor of the cabin. An actuate button is disposed in the cabin of the vehicle and the actuate button is in communication with the pump. Furthermore, the actuate button turns on the pump when the actuate button is depressed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
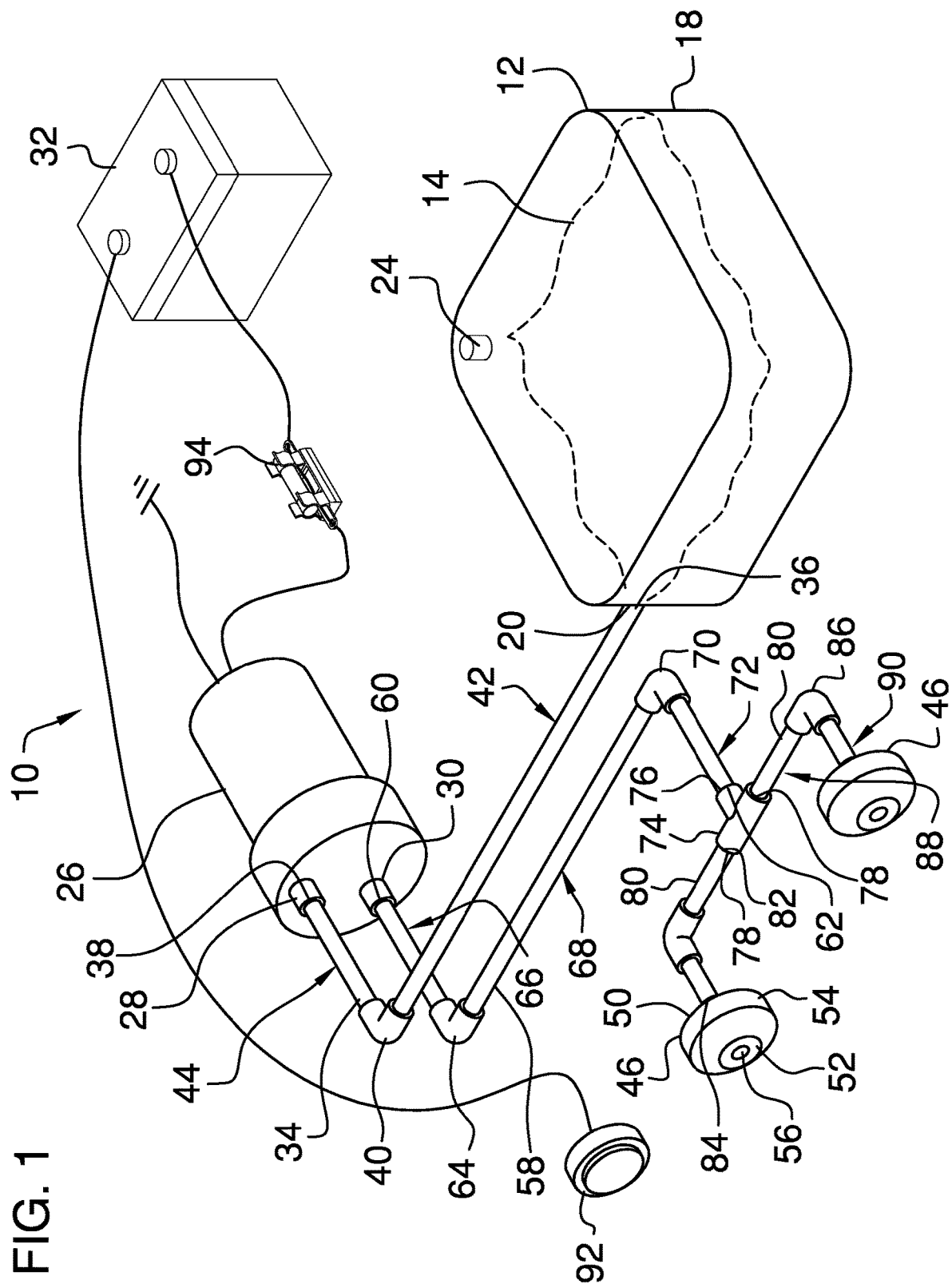
FIG. 1 is a perspective view of a vehicle deodorizer assembly according to an embodiment of the disclosure.
Figure 2:
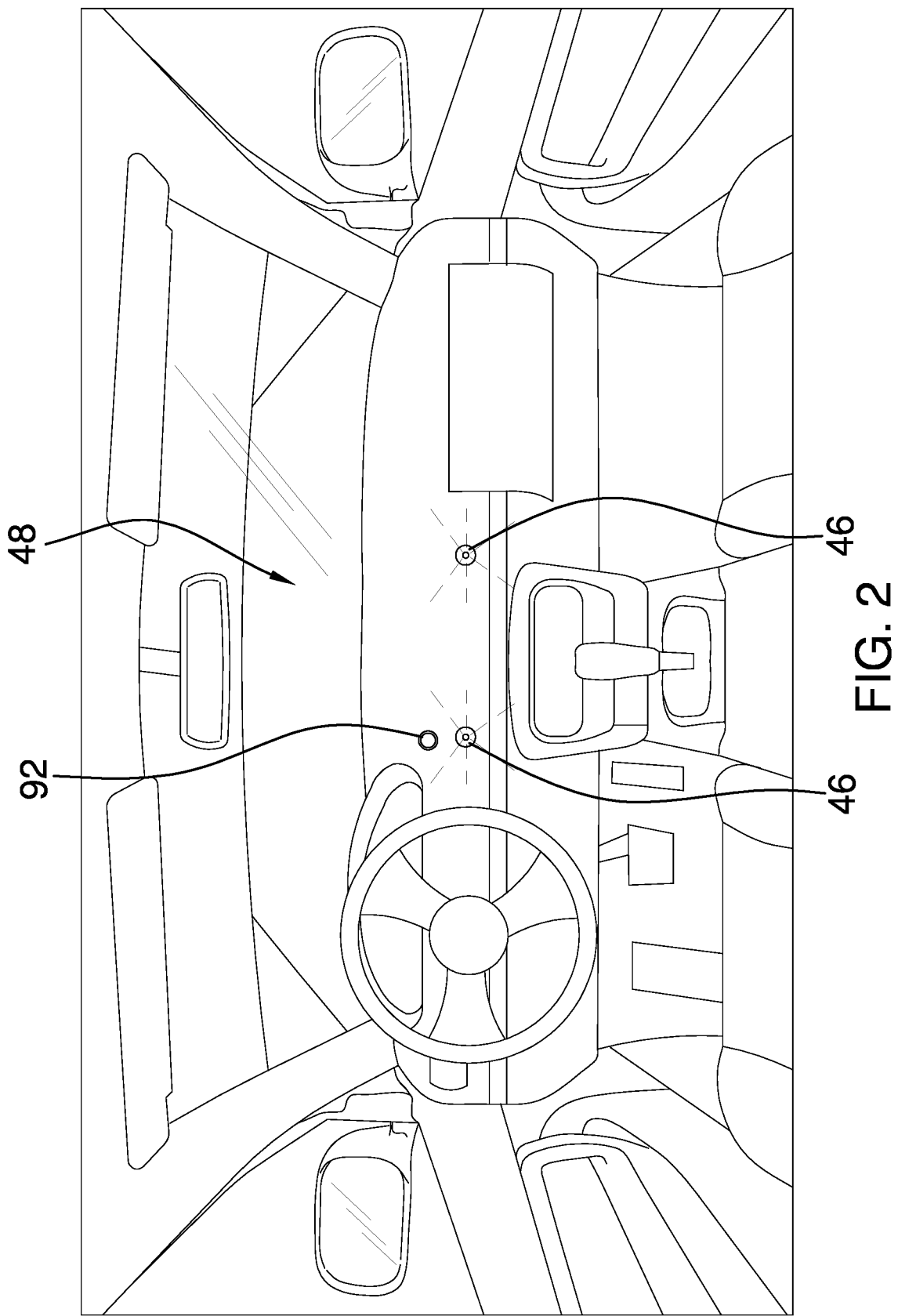
FIG. 2 is an interior view of a cabin of a vehicle of an embodiment of the disclosure.
Figure 3:
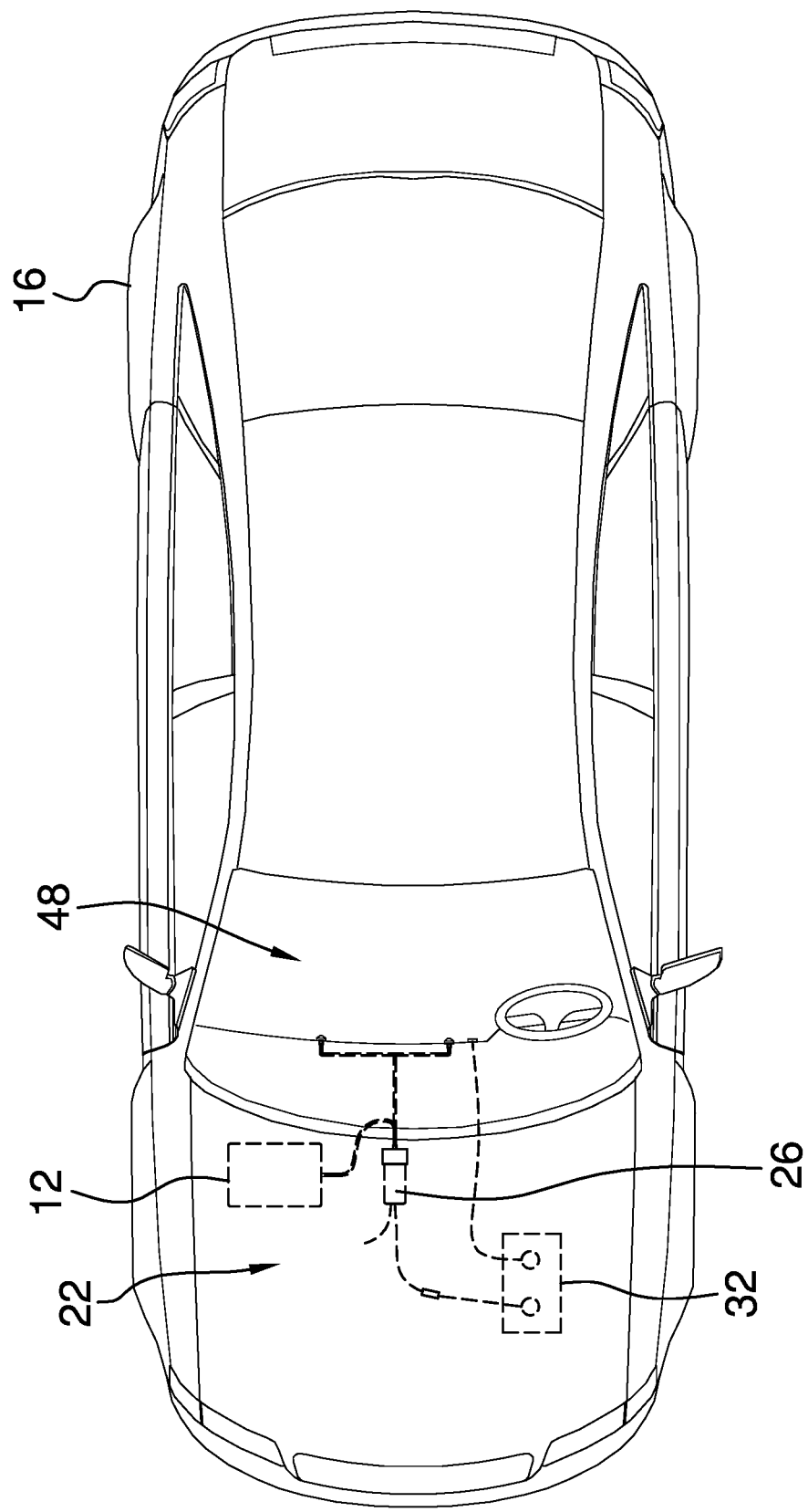
FIG. 3 is a top phantom view of an embodiment of the disclosure.
Figure 4:
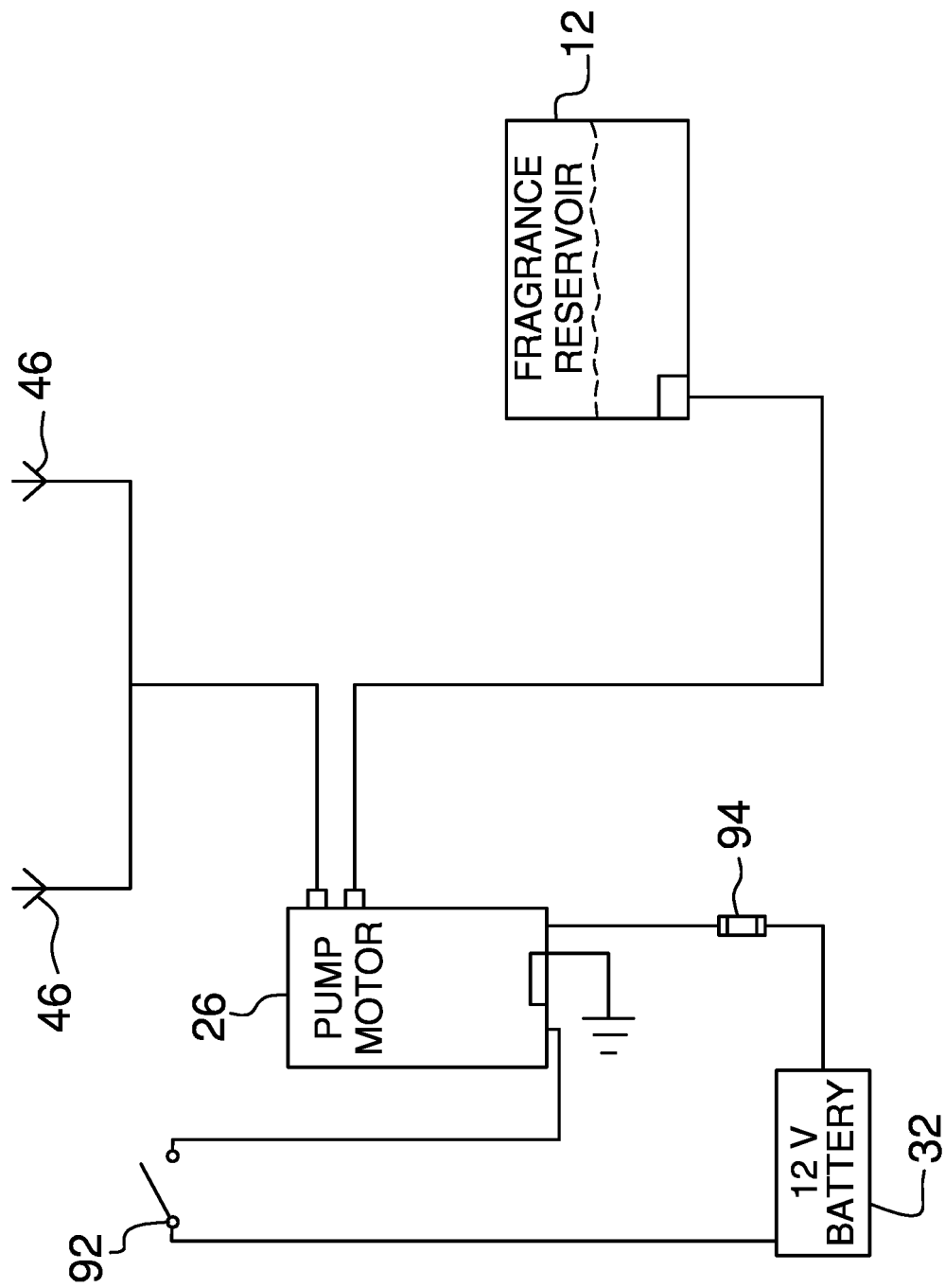
FIG. 4 is a schematic view of an embodiment of the disclosure.

With reference now to the drawings, and in particular to FIGS. 1 through 4 thereof, a new deodorizer device embodying the principles and concepts of an embodiment of the disclosure and generally designated by the reference numeral 10 will be described.

As best illustrated in FIGS. 1 through 4, the vehicle deodorizer assembly 10 generally comprises a reservoir 12 containing a chemical fragrance 14. The chemical fragrance 14 may be an air freshener with a floral scent or other pleasing scent. The reservoir 12 is integrated into a vehicle 16, and the vehicle 16 may be a passenger vehicle, a cargo vehicle or any other motorized vehicle that is driven on public roadways and which has a closed cabin. The reservoir 12 has an outer wall 18 and the outer wall 18 has an outlet 20 that is fluidly integrated into the outer wall 18 thereby facilitating the outlet to release the chemical fragrance 14 from the reservoir 12. Additionally, the reservoir 12 is positioned in an engine bay 22 of the vehicle 16 such that the reservoir 12 is concealed, and the reservoir 12 has a fill port 24 to facilitate the reservoir 12 to be refilled with the chemical fragrance 14.

A pump 26 is provided and the pump 26 is integrated into the vehicle 16. The pump 26 is in fluid communication with the reservoir 12 thereby facilitating the pump 26 to urge the chemical fragrance 14 outward from the reservoir 12. The pump 26 has an intake 28 and an exhaust 30, and the pump 26 is electrically coupled to a power source 32 comprising an electrical system of the vehicle 16. The pump 26 may comprise an electric fluid pump or the like.

An intake pipe 34 is provided that has a first end 36 and a second end 38, and the intake pipe 34 has an elbow 40 that is integrated into the intake pipe 34 to define a first portion 42 of the intake pipe 34 forming an angle with a second portion 44 of the intake pipe 34. Furthermore, the first portion 42 has a length that is greater than a length of the second portion 44. The first end 36 is associated with the first portion 42 and the second end 38 is associated with the second portion 44. Additionally, the first end 36 is fluidly coupled to the outlet 20 in the outer wall 18 of the reservoir 12 and the second end 38 is fluidly coupled to the intake 28 of the pump 26.

A pair of nozzles 46 is provided and each of the nozzles 46 is integrated into the vehicle 16. Each of the nozzles 46 is in fluid communication with the pump 26 such that each of the nozzles 46 receives the chemical fragrance 14 from the pump 26. Moreover, each of the nozzles 46 is positioned in a cabin 48 of the vehicle 16 thereby facilitating the nozzles 46 to release the chemical fragrance 14 into the cabin 48. In this way the nozzles 46 can enhance the odor of the cabin 48. Each of the nozzles 46 has a back side 50, a front side 52 and an outer side 54 extending between the back side 50 and the front side 52. The outer side 54 of each of the nozzles 46 is continuously arcuate about an axis extending between the front side 52 and the back side 50 such that each of the nozzles 46 has a circular shape. Additionally, the front side 52 of each of the nozzles 46 has a spray opening 56 extending into an interior of the nozzles 46 and the back side 50 of each of the nozzles 46 is coupled to a dashboard of the vehicle 16.

An exhaust pipe 58 is provided that has a primary end 60 and a secondary end 62. The exhaust pipe 58 has a first elbow 64 that is integrated into the exhaust pipe 58 to define a primary portion 66 of the exhaust pipe 58 forming an angle with a secondary portion 68 of the exhaust pipe 58. Additionally, the exhaust pipe 58 has a second elbow 70 integrated into the exhaust pipe 58 to define a tertiary portion 72 of the exhaust pipe 58 forming an angle with the secondary portion 68. The primary end 60 is associated with the primary portion 66 and the secondary end 62 is associated with the tertiary portion 72. Furthermore, the primary end 60 is fluidly coupled to the exhaust 30 of the pump 26. A tee 74 is provided that has an inlet 76 and a pair of outlets 78. Each of the outlets 78 of the tee 74 has a direction of flow that is oriented perpendicular to a direction of flow of the inlet 76. The inlet 76 is fluidly coupled to the secondary end 62 of the exhaust pipe 58.

A pair of distribution pipes 80 is provided and each of the distribution pipes 80 has a first end 82 and a second end 84. Each of the distribution pipes 80 has an elbow 86 defining a first portion 88 forming an angle with a second portion 90. The first end 82 of a respective one of the distribution pipes 80 is associated with the first portion 88 of the respective distribution pipe 80. The second end 84 of a respective one of the distribution pipes 80 is associated with the second portion 90 of the respective distribution pipe 80. The first end 82 of each of the distribution pipes 80 is fluidly coupled to a respective one of the outlets 78 of the tee 74 such that the second portion 90 of each of the distribution pipes 80 is oriented parallel to each other. Additionally, the second end 84 of each of the distribution pipes 80 is fluidly coupled to the back side 50 of a respective one of the nozzles 46.

An actuate button 92 is disposed in the cabin 48 of the vehicle 16 such that the actuate button 92 is accessible to a driver. The actuate button 92 is biased into an off position and the actuate button 92 is depressible into an on position. The actuate button 92 is electrically coupled to the pump 26. Additionally, the pump 26 is turned on the urge a predetermined volume of the chemical fragrance 14 outwardly from the nozzles 46 when the actuate button 92 is depressed into the on position. As is most clearly shown in FIG. 1, a fuse 94 is provided which is electrically coupled to the pump 26. The fuse 94 is positioned between the pump 26 and the power source 32 thereby facilitating the fuse 94 to cut electrical communication between the pump 26 and the power source 32 when the pump 26 becomes overloaded. In this way the fuse 94 protects the pump 26 from being damaged.

In use, the actuate button 92 is depressed to turn on the pump 26. In this way the pump 26 directs a predetermined amount of the chemical fragrance 14 to the nozzles 46. Thus, the chemical fragrance 14 is released into the cabin 48 to enhance the odor of the cabin 48. In this way the driver can enjoy the pleasing smell of the chemical fragrance 14 or the driver can cover unpleasing odors that might be entering the cabin 48 from outdoors. The reservoir 12 is refilled with the chemical fragrance 14 is depleted to facilitate the cabin 48 to be continually refreshed with the chemical fragrance 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle deodorizer assembly for releasing a chemical fragrance into a cabin of a vehicle for enhancing the odor of the cabin, said assembly comprising:
   a reservoir containing a chemical fragrance, said reservoir being integrated into a vehicle;
   a pump being integrated into said vehicle, said pump being in fluid communication with said reservoir thereby facilitating said pump to urge said chemical fragrance outward from said reservoir;
   a pair of nozzles, each of said nozzles being integrated into the vehicle, each of said nozzles being in fluid communication with said pump such that each of said nozzles receives said chemical fragrance from said pump, each of said nozzles being positioned in the cabin of the vehicle thereby facilitating said nozzles to release said chemical fragrance into the cabin wherein said nozzles are configured to enhance the odor of the cabin;
   an actuate button being disposed in the cabin of the vehicle wherein said actuate button is configured to be accessible to a driver, said actuate button being in communication with said pump, said actuate button turning on said pump when said actuate button is depressed;

an exhaust pipe having a primary end and a secondary end, said exhaust pipe having a first elbow being integrated into said exhaust pipe to define a primary portion of said exhaust pipe forming an angle with a secondary portion of said exhaust pipe, said exhaust pipe having a second elbow being integrated into said exhaust pipe to define a tertiary portion of said exhaust pipe forming an angle with said secondary portion, said primary end being associated with said primary portion, said secondary end being associated with said tertiary portion, said primary end being fluidly coupled to an exhaust of said pump;

a tee having an inlet and a pair of outlets, each of said outlets of said tee having a direction of flow being oriented perpendicular to a direction of flow of said inlet, said inlet being fluidly coupled to said secondary end of said exhaust pipe; and a pair of distribution pipes, each of said distribution pipes having a first end and a second end, each of said distribution pipes having an elbow defining a first portion forming an angle with a second portion, said first end of a respective one of said distribution pipes being associated with said first portion of said respective distribution pipe, said second end of a respective one of said distribution pipes being associated with said second portion of said respective distribution pipe;

each of said nozzles has a back side, a front side and an outer side extending between said back side and said front side, said outer side of each of said nozzles being continuously arcuate about an axis extending between said front side and said back side such that each of said nozzles has a circular shape, said front side of each of said nozzles having a spray opening extending into an interior of said nozzles, said back side of each of said nozzles being coupled to a dashboard of the vehicle;

wherein said first end of each of said distribution pipes is fluidly coupled to a respective one of said outlets of said tee such that said second portion of each of said distribution pipes is oriented parallel to each other, said second end of each of said distribution pipes being fluidly coupled to said back side of a respective one of said nozzles.

2. The assembly according to claim 1, wherein said reservoir has an outer wall, said outer wall having an outlet being fluidly integrated into said outer wall thereby facilitating said outlet to release said chemical fragrance from said reservoir, said reservoir being positioned in an engine bay of the vehicle wherein said reservoir is configured to be concealed.

3. The assembly according to claim 2, wherein:
said pump has an intake and the exhaust, said pump being electrically coupled to a power source comprising an electrical system of the vehicle; and
said assembly includes an intake pipe having a first end and a second end, said intake pipe having an elbow being integrated into said intake pipe to define a first portion of said intake pipe forming an angle with a second portion of said intake pipe, said first portion having a length being greater than a length of said second portion, said first end being associated with said first portion, said second end being associated with said second portion, said first end being fluidly coupled to said outlet in said outer wall of said reservoir, said second end being fluidly coupled to said intake of said pump.

4. The assembly according to claim 1, wherein said actuate button is biased into an off position, said actuate button being depressible into an on position, said actuate button being electrically coupled to said pump, said pump being turned on the urge a pre-determined volume of said chemical fragrance outwardly from said nozzles when said actuate button is depressed into said on position.

5. A vehicle deodorizer assembly for releasing a chemical fragrance into a cabin of a vehicle for enhancing the odor of the cabin, said assembly comprising:

a reservoir containing a chemical fragrance, said reservoir being integrated into a vehicle, said reservoir having an outer wall, said outer wall having an outlet being fluidly integrated into said outer wall thereby facilitating said outlet to release said chemical fragrance from said reservoir, said reservoir being positioned in an engine bay of the vehicle wherein said reservoir is configured to be concealed;

a pump being integrated into said vehicle, said pump being in fluid communication with said reservoir thereby facilitating said pump to urge said chemical fragrance outward from said reservoir, said pump having an intake and an exhaust, said pump being electrically coupled to a power source comprising an electrical system of the vehicle;

an intake pipe having a first end and a second end, said intake pipe having an elbow being integrated into said intake pipe to define a first portion of said intake pipe forming an angle with a second portion of said intake pipe, said first portion having a length being greater than a length of said second portion, said first end being associated with said first portion, said second end being associated with said second portion, said first end being fluidly coupled to said outlet in said outer wall of said reservoir, said second end being fluidly coupled to said intake of said pump;

a pair of nozzles, each of said nozzles being integrated into the vehicle, each of said nozzles being in fluid communication with said pump such that each of said nozzles receives said chemical fragrance from said pump, each of said nozzles being positioned in the cabin of the vehicle thereby facilitating said nozzles to release said chemical fragrance into the cabin wherein said nozzles are configured to enhance the odor of the cabin, each of said nozzles having a back side, a front side and an outer side extending between said back side and said front side, said outer side of each of said nozzles being continuously arcuate about an axis extending between said front side and said back side such that each of said nozzles has a circular shape, said front side of each of said nozzles having a spray opening extending into an interior of said nozzles, said back side of each of said nozzles being coupled to a dashboard of the vehicle;

an exhaust pipe having a primary end and a secondary end, said exhaust pipe having a first elbow being integrated into said exhaust pipe to define a primary portion of said exhaust pipe forming an angle with a secondary portion of said exhaust pipe, said exhaust pipe having a second elbow being integrated into said exhaust pipe to define a tertiary portion of said exhaust pipe forming an angle with said secondary portion, said primary end being associated with said primary portion, said secondary end being associated with said tertiary portion, said primary end being fluidly coupled to said exhaust of said pump;
a tee having an inlet and a pair of outlets, each of said outlets of said tee having a direction of flow being oriented perpendicular to a direction of flow of said inlet, said inlet being fluidly coupled to said secondary end of said exhaust pipe;
a pair of distribution pipes, each of said distribution pipes having a first end and a second end, each of said distribution pipes having an elbow defining a first portion forming an angle with a second portion, said first end of a respective one of said distribution pipes being associated with said first portion of said respective distribution pipe, said second end of a respective one of said distribution pipes being associated with said second portion of said respective distribution pipe, said first end of each of said distribution pipes being fluidly coupled to a respective one of said outlets of said tee such that said second portion of each of said distribution pipes is oriented parallel to each other, said second end of each of said distribution pipes being fluidly coupled to said back side of a respective one of said nozzles; and
an actuate button being disposed in the cabin of the vehicle wherein said actuate button is configured to be accessible to a driver, said actuate button being biased into an off position, said actuate button being depressible into an on position, said actuate button being electrically coupled to said pump, said pump being turned on the urge a pre-determined volume of said chemical fragrance outwardly from said nozzles when said actuate button is depressed into said on position.

6. A vehicle deodorizer system for releasing a chemical fragrance into a cabin of a vehicle for enhancing the odor of said cabin, said system comprising:
a vehicle having a cabin;
a reservoir containing a chemical fragrance, said reservoir being integrated into said vehicle, said reservoir having an outer wall, said outer wall having an outlet being fluidly integrated into said outer wall thereby facilitating said outlet to release said chemical fragrance from said reservoir, said reservoir being positioned in an engine bay of said vehicle wherein said reservoir is configured to be concealed;
a pump being integrated into said vehicle, said pump being in fluid communication with said reservoir thereby facilitating said pump to urge said chemical fragrance outward from said reservoir, said pump having an intake and an exhaust, said pump being electrically coupled to a power source comprising an electrical system of said vehicle;
an intake pipe having a first end and a second end, said intake pipe having an elbow being integrated into said intake pipe to define a first portion of said intake pipe forming an angle with a second portion of said intake pipe, said first portion having a length being greater than a length of said second portion, said first end being associated with said first portion, said second end being associated with said second portion, said first end being fluidly coupled to said outlet in said outer wall of said reservoir, said second end being fluidly coupled to said intake of said pump;
a pair of nozzles, each of said nozzles being integrated into said vehicle, each of said nozzles being in fluid communication with said pump such that each of said nozzles receives said chemical fragrance from said pump, each of said nozzles being positioned in said cabin of said vehicle thereby facilitating said nozzles to release said chemical fragrance into said cabin wherein said nozzles are configured to enhance the odor of said cabin, each of said nozzles having a back side, a front side and an outer side extending between said back side and said front side, said outer side of each of said nozzles being continuously arcuate about an axis extending between said front side and said back side such that each of said nozzles has a circular shape, said front side of each of said nozzles having a spray opening extending into an interior of said nozzles, said back side of each of said nozzles being coupled to a dashboard of said vehicle;
an exhaust pipe having a primary end and a secondary end, said exhaust pipe having a first elbow being integrated into said exhaust pipe to define a primary portion of said exhaust pipe forming an angle with a secondary portion of said exhaust pipe, said exhaust pipe having a second elbow being integrated into said exhaust pipe to define a tertiary portion of said exhaust pipe forming an angle with said secondary portion, said primary end being associated with said primary portion, said secondary end being associated with said tertiary portion, said primary end being fluidly coupled to said exhaust of said pump;
a tee having an inlet and a pair of outlets, each of said outlets of said tee having a direction of flow being oriented perpendicular to a direction of flow of said inlet, said inlet being fluidly coupled to said secondary end of said exhaust pipe;
a pair of distribution pipes, each of said distribution pipes having a first end and a second end, each of said distribution pipes having an elbow defining a first portion forming an angle with a second portion, said first end of a respective one of said distribution pipes being associated with said first portion of said respective distribution pipe, said second end of a respective one of said distribution pipes being associated with said second portion of said respective distribution pipe, said first end of each of said distribution pipes being fluidly coupled to a respective one of said outlets of said tee such that said second portion of each of said distribution pipes is oriented parallel to each other, said second end of each of said distribution pipes being fluidly coupled to said back side of a respective one of said nozzles; and
an actuate button being disposed in said cabin of said vehicle wherein said actuate button is configured to be accessible to a driver, said actuate button being biased into an off position, said actuate button being depressible into an on position, said actuate button being electrically coupled to said pump, said pump being turned on the urge a pre-determined volume of said chemical fragrance outwardly from said nozzles when said actuate button is depressed into said on position.

* * * * *